Aug. 22, 1967    W. J. ROZMUS    3,336,655
DIE STRUCTURE

Filed March 27, 1964    2 Sheets-Sheet 1

INVENTOR.
WALTER J. ROZMUS
BY Watts & Fisher, attys.

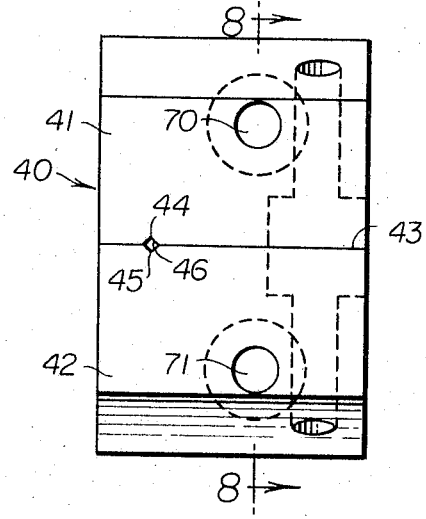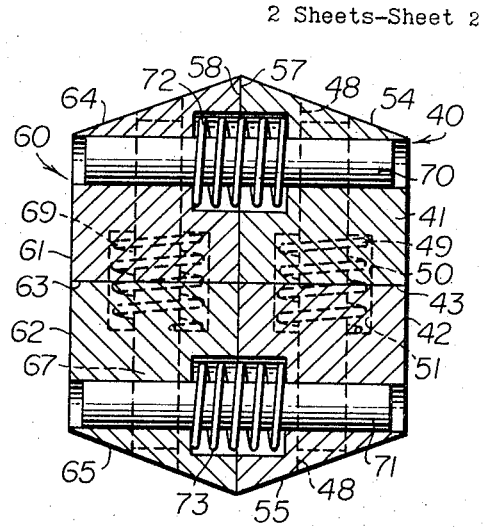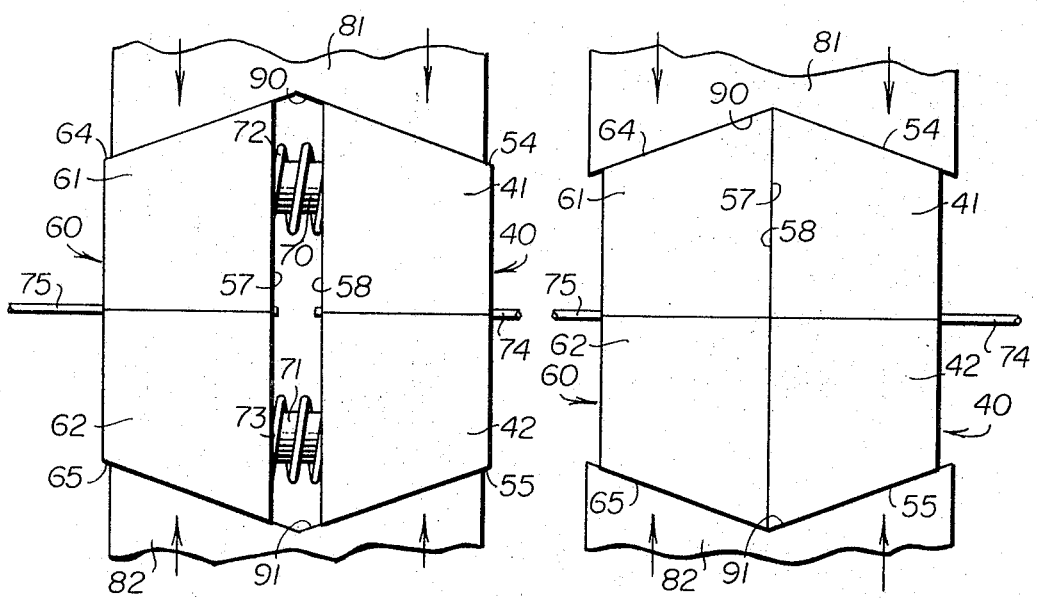

United States Patent Office 3,336,655
Patented Aug. 22, 1967

3,336,655
DIE STRUCTURE
Walter J. Rozmus, Hubbardsville, N.Y., assignor to
Kelsey-Hayes Company, Utica, N.Y.
Filed Mar. 27, 1964, Ser. No. 355,349
4 Claims. (Cl. 29—470.1)

This invention relates generally to the art of cold pressure welding, and more specifically to an improved pressure weld forming die and process of welding.

The invention is particularly concerned with apparatus which can be used to form a true pressure weld by the steps including grasping first and second workpieces by first and second spaced, cold pressure weld forming dies with portions of the workpieces extending beyond the dies a sufficient distance to cause upsetting of the workpieces when the dies are closed together and then closing the dies together to upset the workpieces by mutual contact under high pressure. The dies of this invention are especially suited for the so-called "multiple upset" method of welding in which the dies are returned to spaced relationship and the welding steps are repeated until the weld is completed. A more complete disclosure of this multiple upset pressure welding tcehnique is presented in U.S. Patent No. 3,06,0113 for Method of Pressure Welding Metals, issued Oct. 8, 1963 to Walter J. Rozmus.

Prior to the invention of the multiple upset technique, it was generally believed that it was imposisble to weld fine wire and the like by cold pressure welding. Even though it is now recognized that it is possible to weld fine wires, several problems have inhibited the commercial application of this possibility.

The conventional pressure weld forming dies used in carrying out cold pressure welding of wires have round openings in which the workpieces are recived and clamped. The round openings of the conventional dies are defined by cooperating grooves in the mating surfaces of the die setcions. The practice which has been followed in forming a round die opening has been to clamp the sections of the split die together and to drill an opening of the desired size laong the interface formed by the abutting surfaces of the die sections. In use of the die, a workpiece is positioned between the die sections so that the workpiece will be confined and clamped in the round opening when the die setcions are brought together.

Principal among the problems which have inhibited the commercial application of multiple upset welding of fine wire are those which have been encountered with the conventional pressure weld forming dies having round openings. One of the more serious of these problems is that a die with a round opening of a given size affords little tolerance in the size of the workpiece which can be effectively clamped for the pressure welding operation. On the one hand, the die opening must be small enough to confine the workpieces completely and prevent slippage. On the other hand, if the opening is too small, or, conversely, if the workpiece is too large for the opening, the die sections will not close completely and as a consequence the workpiece will be pinched between the sections of the die. Such a condition usually results in a poor weld. In addition, flash will be formed on the workpieces adajacent the weld.

In order to avoid the extreme conditions described above, that is, the condition in which the workpiece is pinched by the die sections and the condition in which the workpiece simply slips in the die without any upsetting action, it has been found in practice that the round die holes must be drilled almost exactly to the work diameter. This means that because of variations in diameter of any given gage of wire permitted by standard manufacturing tolerances, a single die will not take all wires of a given gage. Hence, large numbers of dies have been required prior to this invention in carrying out commercial pressure welding operations.

With relatively large size workpieces, usable, but not optimum, welds are produced when the die holes are slightly small. Where the workpieces are wires of fine size, the die holes must almost exactly match the workpiece if a usable weld and, in fact, any weld is formed. Thus, standard variations in wire size due to manufacturing tolerances cause difficulty in repetitively producing usable welds on a production basis.

Another problem of the conventional die construction is that each individual die is expensive. This is primarily due to the difficulties involved in preventing the drill from "wandering" when drilling the round holes and the high drill breakage encountered due to the relatively long length of a hole in relation to the diameter. The difficulties increase as the hole decreases in size so that, as a practical matter, the cost of drilling a round hole in the .005 inch to .015 inch diameter range is commercially prohibitive.

Another problem overcome by this invention is that wires tend to stick in the die holes after a worpiece upsetting closing of the dies. This sticking causes difficulty in performing the multiple upset process because it tends to interfere with indexing of the dies relative to the workpieces.

The discussed problems and others have been overcome in the present invention through the provision of a workpiece gripping hole which has a plurality of flat sides and is a parallelogram preferably square in cross section. The hole is of a cross sectional area substantially equal to the cross sectional area of the wire. With this invention: (1) greater uniformity and quality is obtained in wires of all sizes; (2) greater wire size variations are accommodated by a single die; (3) it is practical to make dies commercially for fine wires; (4) dependable welds can be made with very fine wires; and, (5) the workpieces are released easily when the die sections are opened for indexing.

With the process of this invention, die sections equipped with holes of a cross section different than the cross section of the workpieces but of comparable area are provided. The die sections are closed to establish lines of contact with the workpieces and thereafter the closing is continued to deform the workpieces and establish areas of contact.

An object of the present invention is to provide new and useful improvements in the construction of pressure weld forming dies.

A more specific object of the invention is to provide a pressure weld forming die construction which can handle workpieces within a wide tolerance range.

Another object of the invention is to provide a pressure weld forming die construction which can handle a range of different size workpieces without pinching the workpieces to produce a poor weld area or allowing the workpieces to slip in the die so that an upsetting action is improper or prevented.

Still another object of the invention is to provide pressure weld forming dies as described above which are relatively inexpensive and are easier to make than conventional dies with round openings.

A principal object of the invention is to establish a novel and improved process of cold pressure welding.

Other objects and a fuller understanding of the invention will be had by reference to the following detailed description and the accompanying drawings.

In the drawings:

FIGURES 1, 2, and 3 are diagrammatical illustrations showing deleterious conditions obtained with the prior art die construction;

FIGURE 7 is a side elevational view of the preferred die construction according to this invention;

FIGURE 8 is a cross-sectional view taken on the line 8—8 of FIGURE 7;

FIGURE 9 is a side elevational view showing first and second weld-forming dies gripping first and second workpieces in spaced relationship;

FIGURE 10 is a view similar to FIGURE 9 showing the weld forming dies closed together to produce the pressure weld; and, FIGURE 11 is a plan view schematically illustrating a pressure welding apparatus in its open position.

Figure 1:
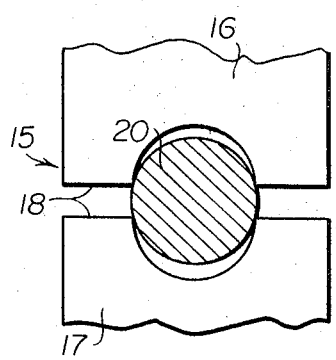
Figure 2:
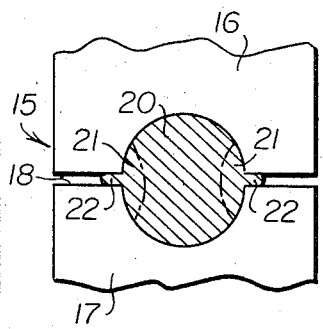
Figure 3:
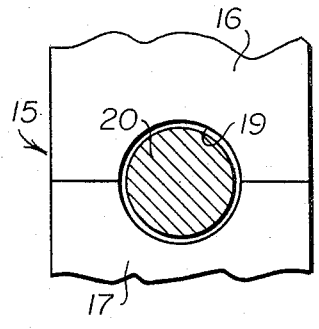

In order to clarify for better understanding the problems encountered with conventional pressure weld-forming dies, reference is first made to FIGURES 1, 2, and 3 of the drawings which illustrate the adverse conditions experienced unless the round die holes are drilled almost exactly to the work diameter. The conventional die construction is generally indicated by reference numeral 15 and is shown to include die sections 16, 17. The die sections 16, 17 are formed with grooves in their mating surfaces 18 and these grooves cooperate to define a round opening 19 (FIGURE 3) through the die when the sections are closed together. The workpiece, in this case a wire, is indicated by reference numeral 20.

FIGURE 1 illustrates the condition in which the wire 20 is too large for the die opening 19. In this situation, the die sections 16, 17 cannot be fully closed together to grasp the wire for a good weld-forming operation. More particularly, the wire 20 will be pinched between the die sections 16, 17, as shown in FIGURE 2, thereby preventing the dies from completely closing. When a pressure welding operation is carried out with the wire pinched between the dies as shown in FIGURE 2, a poor weld usually results in the areas 21. In addition, flash 22 will be produced between the die sections 16 and 17 when they are closed.

FIGURE 3 shows the condition in which the wire is smaller than the die opening 19. It will be appreciated that it is necessary to bring the workpieces into mutual contact under high pressure in order to produce a flow of the metal and a true pressure weld. When the wire is too small for the opening, it will obviously slip through the die without any upsetting action.

As previously discussed, the conventional die 15 with the round opening 19 affords only a very limited tolerance in the size of the wire which can be accepted and must, as a practical matter, be drilled almost exactly to the same size. For example, if the die opening 19 has a diameter of 0.040 of an inch, it would be considered fortunate if the die would take a 0.039 inch to 0.041 inch wire without producing the problems illustrated in FIGURES 1, 2, or 3. Thus, the workpiece tolerance in this specific example is only plus or minus .001 of an inch.

Structurally, the basic concept of the present invention comprises the provision of a pressure weld forming die having a parallelogram and preferably square opening as distinguished from the round opening of the prior art. The opening in the plane of surface abutment of the sections has a transverse dimension greater than the cross sectional area of a circle of equal area. Among the advantages to be more specifically described, it has been discovered that a pressure weld forming die having a square opening can be used to clamp workpieces of different diameters while avoiding the problems discussed above. Further, the square opening is easier to form than a round opening, particularly in the smaller size ranges.

Figure 4:
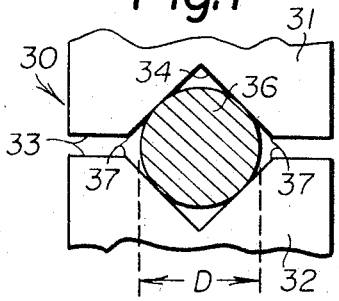
FIGURE 4 is a diagrammatical illustration showing a workpiece inserted between the sections of a die formed according to the present invention.
Figure 6:
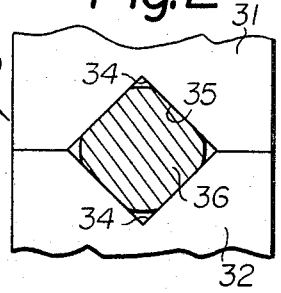
FIGURE 6 is another diagrammatical illustration showing a slightly undersized workpiece in the new die.
Figure 5:
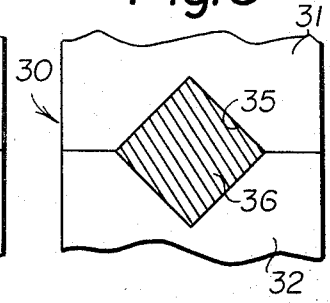
FIGURE 5 is a diagrammatical illustration similar to FIGURE 4 showing the workpiece gripped between the die sections.

The concept of this invention will be more clearly apparent by reference to FIGURES 4, 5, and 6. The illustrated weld forming die is generally indicated by reference numeral 30 and is shown to comprise die sections 31, 32. The die sections 31, 32 have mating surfaces 33. Right angle V-channels 34 are formed in the surfaces 33 and terminate at edges 37. In the closed position of the die sections 31, 32, the channels 34 cooperate to define a square die opening 35. Thus, formed, the mouth of each channel 34 has a maximum dimension which is equal to a diagonal of the square opening in cross section.

FIGURE 4 shows the die 30 in its open position and a pressure weldable wire 36 having a diameter D inserted between the die sections 31, 32. In this position, four spaced lines of contact have been established between the die channels and the workpiece. In FIGURE 5 the die 30 is shown with the die sections 31, 32 closed on the wire 36 having deformed it into a square cross section to establish areas of contact with the channels and grasp it for the pressure welding operation. From FIGURES 4 and 5 it will be apparent that the die 30 can close on a wire having a maximum diameter D which results in a cross-sectional area equal to the cross-sectional area of the square opening 35 without pinching the wire as illustrated in FIGURE 2. Moreover, the die 30 can be used to grasp a wire having a diameter considerably less than the maximum diameter D without encountering the problem of FIGURE 3. This important advantage is due to the fact that the side of any square is approximately 88.6% of the diameter of a circle of equal area. Thus, the four sides of the square die opening 35 designed for a specific maximum wire diameter D will still touch and grip a round wire that is 11.4% smaller in diameter as illustrated in FIGURE 6, where the wire has been only partially deformed to a square cross section. In the example given above involving a die designed for a .040 inch diameter wire, a die formed with a square opening according to this invention will, for example, accept a wire down to .0355 inch in diameter as compared to a minimum .039 inch diameter wire for a conventional die with a round opening.

In practice some slippage of the wire may initially occur when it has a cross-sectional area less than the area of the square die opening, this being particularly true when the wire diameter is from about 10% to 11.4% less than the maximum wire diameter D. Repeated upsetting of the wire during the work cycle causes the metal gradually to flow and fill the die openings until it has, in cross section, the appearance of FIGURE 5. This upsetting action and flowing of the metal results in the wire being firmly grasped by the die so that a true weld is produced under high pressure.

In addition to providing a pressure weld forming die which covers a larger range of wire sizes than a conventional die, the invention also makes it possible to form the die with a smaller opening than could be economically provided heretofore. This is because the right angle V-channels 34 can be cut in the mating surfaces of the die sections 31, 32 more easily and more economically than drilling a round hole. Moreover, mating surfaces 43, 63, FIGURES 7 and 8, of the dies may be ground to alter the die to take smaller sized wires. Thus, if one wishes to alter a die to take smaller sizes or if an error in die manufacture results in a hole that is too large, the die can be modified by grinding or otherwise dressing the mating surfaces 43, 63.

Reference is now made to FIGURES 7–10 which illustrates a preferred pressure weld forming die apparatus embodying the inventive concept described above. The illustrated die assembly includes a composite split die 40 and a matching composite split die 60. The die 40 is composed of die sections 41, 42 having the mating surfaces 43. Coextensive right angle V-channels 44, 45 are formed in the mating surfaces 43 of the die sections 41, 42, respectively.

The die sections 41, 42 are connected for rectilinear movement between an open position in which the die sections are spaced apart and a closed position in which the mating surfaces 43 are in engagement so that the channels 44, 45 define a square opening 46 through the die 40. To this end, a section pin 47 is slidably mounted in aligned holes 48 which are formed in the die section 41, 42. A compression spring 49 is disposed between the die sections 41, 42 and serves to urge the die sections to their open, spaced apart position. In the construction shown, the spring 49 is mounted in a chamber formed by cooperating recesses 50, 51 in the die sections 41, 42, respectively.

The die 60 is identical in construction to the die 40. Accordingly, the die 60 is composed of sections 61, 62 which have mating surfaces 63. Right angle V-channels (not shown) which are identical to the channels 44, 45 are formed in the mating surfaces 63 and serve to define a square die opening which is aligned with the die opening 46 in the die 40. The die sections 61, 62 of the die 60 are connected together by a section pin 67. The die sections are urged to their open position by a spring 69 which is mounted around the pin 67 in recesses formed in the die sections.

It is necessary that the dies 40, 60 move in true relationship with respect to one another and be held against offset movement under the thrust created by the upset welding action. To this end, the dies 40, 60 are connected by die pins or bars 70, 71. The die pin 70 is slidably mounted in aligned holes formed in the split die sections 41, 61. A compression spring 72 is disposed around the die pin 70 in cooperating recesses formed in the die sections 41, 61. The die pin 71 is similarly mounted between the split die sections 42, 62. A spring 73 on the die pin 72 is mounted between the die sections 42, 62 in cooperating recesses. The springs 72, 73 urge the dies 40, 60 away from each other to an open position.

In use, the springs 49, 69 are allowed to urge the die sections 40, 60 into spaced relation. A pressure weldable workpiece 74 is then inserted between the die sections 41, 42 of the die 40 and the die sections are closed together to clamp the workpiece firmly. A similar pressure weldable workpiece 75 is clamped between the die sections 61, 62 of the die 60. These workpieces 74, 75 are positioned to project toward each other from the die a sufficient distance to permit an upsetting action.

The dies 40, 60 are then closed together as shown in FIGURE 10 to bring faces 57, 58 into abutment and to upset the projecting portions of the workpieces 74, 75 by mutual contact under high pressure. Since a pressure weld usually will not be formed by one upsetting stroke of the dies when small or contaminated workpieces are employed, the dies are released from the workpieces and returned into their original position of spaced relation. Thereupon, the dies 40, 60 are actuated to regrasp the workpieces 74, 75, respectively, and are again closed together to cause further upsetting of the workpieces. This upsetting work cycle is repeated as many times as is necessary to produce a true pressure weld between the workpieces 74, 75.

Figure 11:
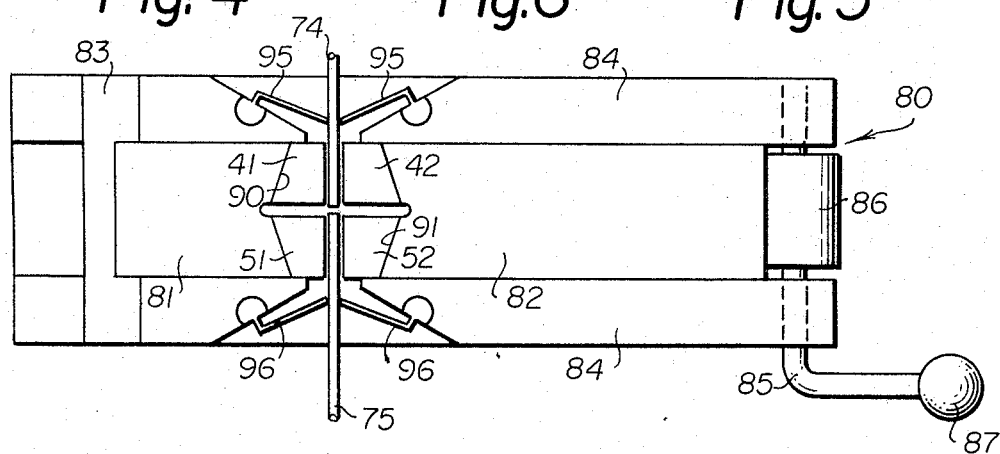

There are many possible mechanisms which can be employed successfully to actuate the pressure welding dies 40, 60. One such mechanism is schematically illustrated in FIGURE 11. Other devices which can be used with little modification are disclosed in U.S. Patent No. 2,889,622, issued June 9, 1959 to W. A. Barnes for Cold Weld Butt Tool, and in U.S. Patent No. 3,093,018, issued June 11, 1963, to W. J. Rozmus for Apparatus for Multiple Upset Welding.

Referring to FIGURE 11, the illustrated die actuating mechanism 80 is shown to include relatively movable die carriages 81, 82. In the construction shown, the die carriage 81 is fixed to a frame 83 and the carriage 82 is movable toward and away from the carriage 81 between guide rails 84 which are part of the frame. A shaft 85 is journaled in the frame and is provided with an actuating cam 86 and a handle 87. Rotation of the handle 87 serves to engage the cam 86 with the rear wall of the die carriage 82 so that continued rotation of the cam will drive the carriage toward the other die carriage 81. When the force of the actuating cam 86 is released, the carriage 82 may be returned to its original position by suitable springs (not shown) or by the action of the springs of the die assembly itself.

The die carriages 81, 82 are formed with tapered die beds 90, 91, respectively, which open through confronting walls of the carriages. The die bed 90 is formed by wall surfaces which converge inwardly of the die carriage 81. The tapered die portion 91 is similarly formed by tapered surfaces which converge inwardly of the die carriage 82.

The dies 40, 60 are preferably mounted with a section in each of the tapered beds 90, 91. Thus, the die sections 41, 61 may be mounted in the die bed 90 and the die sections 42, 62 mounted in the die bed 91.

Referring again to FIGURES 8–10, it will be seen that the die sections 41, 61 are formed with outer walls 54, 64, respectively, which conform to the inwardly converging surfaces of the tapered die bed 90. The die sections 42, 62 are similarly formed with outer walls 55, 65, respectively, which conform to the inwardly tapering surfaces of the die bed 91.

In order to maintain the workpieces 74, 75 in alignment within the dies 40, 60, especially as the dies are indexed during a multiple upset operation, the mechanism 80 is preferably provided with a pair of work engaging fingers 95 adjacent the die 40 and a similar pair of cooperating fingers 96 adjacent the die 60. The fingers 95, 96 are in the form of plates which are pivotally connected at the ends to the rails 84. The distal end portions of each cooperating pair of fingers slope toward the adjacent die and are adapted to engage opposite sides of a workpiece so as to hold the workpiece between the die sections when in an open position.

Taking FIGURES 9, 10, and 11 in conjunction, it will be apparent that movement of the die carriage 82 toward the fixed carriage 81 will first cause the dies 40, 60 to clamp on the workpieces 74, 75, respectively. Continued movement of the carriage 82 will drive the dies together to the weld position shown in FIGURE 10 wherein the projecting end portions of the workpieces 74, 75 are upset by mutual contact under high pressure. The pivotal fingers 95, 96 permit longitudinal movement of the wires 74, 75, respectively, as the dies 40, 60 are closed together.

When the driving force of the actuating cam 86 is released, the die springs 49, 69 will separate the sections of the dies 40, 60, respectively. At the same time, the springs 72, 73 will force the dies 40, 60 apart so that the carriage 82 is returned to its original position. The fingers 95, 96 prevent movement of the wires when the dies are opened so that when the carriage 82 is again actuated to start another work cycle, the dies 40, 60 will grip the workpieces a sufficient distance from the mutually contacting portions of the workpieces to cause a further upsetting.

In summary of the foregoing, the present invention affords two basic and important advantages. It provides for the construction of a pressure weld forming die which can be used to clamp wires and other workpieces over a larger size range than heretofore possible. In addition, the pressure weld forming dies of this invention can be made more economically than the conventional dies with round openings. A concomitant advantage is that the new dies of this invention can be economically formed with smaller openings than could be formed in conventional pressure weld forming dies.

Many modifications and variations of the invention will be apparent to those skilled in the art in view of the foregoing detailed disclosure, therefore, it is to be understood that, within the scope of the appended claims, the inven-

What is claimed is:

1. The process of effecting a cold pressure weld with a pair of cold pressure weldable metal workpieces and first and second split dies each having sections equipped with mating faces, said mating faces of each die, when in abutting relationship, defining a workpiece gripping hole therein of a cross sectional contour different than the contour of the workpieces, the cross sectional area of the holes being greater than the cross sectional area of the workpieces, comprising the steps of:
   (a) separating the sections of each die;
   (b) positioning first and second workpieces in the first and second dies respectively with portions of the pieces projecting past the die faces;
   (c) closing the die sections on the workpieces thereby bringing the workpieces into line contact with said hole portions;
   (d) completing the closing of the die sections thereby deforming the workpieces partially into the cross section of the holes and establish work gripping surface area contact between the dies and the workpieces; and,
   (e) mutually upsetting the projecting workpiece portions to weld the workpieces by forcing said dies together and simultaneously displacing metal from the workpiece portions into the holes to increase the areas of workpiece gripping contact and cause sections of the workpieces in the holes to assume substantially the cross-sectional contour of the holes, thereby preventing slippage of the workpieces relative to the dies to permit completion of the weld.

2. The process of claim 1 wherein the workpieces are round wires and portions of said workpieces are deformed to a square cross section during step (e).

3. The process of effecting a cold pressure weld with a pair of cold pressure weldable metal workpieces and first and second split dies each having sections equipped with mating faces, said mating faces of each die, when in abutting relationship, defining a workpiece gripping hole therein of a cross sectional contour different than the contour of the workpieces, the cross sectional area of the holes being greater than the cross sectional area of the workpieces, comprising the steps of:
   (a) separating the sections of each die;
   (b) positioning first and second workpieces in the first and second dies respectively with portions of the pieces projecting past the die faces;
   (c) closing the die sections on the workpieces thereby bringing the workpieces into line contact with said hole portions while the workpieces are spaced from said edges;
   (d) completing the closing of the die sections thereby deforming the workpieces partially into the cross section of the holes and establish work gripping surface area contact between the dies and the workpieces;
   (e) mutually upsetting the projecting workpiece portions to partially weld the workpieces by forcing said dies together and simultaneously displacing metal from the workpiece portions into the holes to increase the areas of workpiece gripping contact and cause sections of the workpieces in the holes to assume substantially the cross-sectional contour of the holes, thereby preventing slippage of the workpieces relative to the dies to permit completion of the weld.
   (f) separating the die sections and dies to release the workpieces and index the dies and workpieces relatively while the workpieces are held in fixed relative position; and,
   (g) repeating steps (c), (d), and (e) to complete the weld.

4. The process of claim 3 wherein the workpieces are round wires and portions of said workpieces are deformed to a square cross section during step (e).

References Cited

UNITED STATES PATENTS

| | | | |
|---|---|---|---|
| 585,160 | 6/1897 | Eyre | 219—101 |
| 790,140 | 5/1905 | Krepp | 10—79 |
| 1,672,808 | 6/1928 | Hansel | 269—268 |
| 1,749,006 | 3/1930 | Trebes | 219—161 |
| 3,044,328 | 7/1962 | Zysk | 228—3 |

JOHN F. CAMPBELL, *Primary Examiner.*

M. L. FAIGUS, *Assistant Examiner.*